United States Patent [19]
Coan et al.

[11] Patent Number: 5,093,824
[45] Date of Patent: Mar. 3, 1992

[54] DISTRIBUTED PROTOCOL FOR IMPROVING THE SURVIVABILITY OF TELECOMMUNICATIONS TRUNK NETWORKS

[75] Inventors: Brian A. Coan, Morris Plains; Mario P. Vecchi, Somerville; Liang T. Wu, Gladstone, all of N.J.

[73] Assignee: Bell Communications Research, Inc., Livingston, N.J.

[21] Appl. No.: 499,881

[22] Filed: Mar. 27, 1990

[51] Int. Cl.⁵ .............................................. H04J 3/14
[52] U.S. Cl. ..................................... 370/16; 371/11.1
[58] Field of Search ................ 370/16, 14, 60, 58.1; 371/11.1, 20.1, 26, 11.2

[56] References Cited

U.S. PATENT DOCUMENTS

| | | | |
|---|---|---|---|
| 4,696,001 | 9/1987 | Gagliardi et al. | 370/16 |
| 4,747,100 | 5/1988 | Roach et al. | 370/85.5 |
| 4,825,206 | 4/1989 | Brice, Jr. et al. | 370/16 |
| 4,920,529 | 4/1990 | Sasaki et al. | 370/16 |

OTHER PUBLICATIONS

R. J. Boehm et al., "Standardized Fiber Optic Transmission Systems—A Synchronous Optical Network View", IEEE Journal on Selected Areas in Comm., vol. SAC-4, No. 9, Dec. 1986.
Satoshi Hasegawa et al., "Dynamic Reconfiguration of Digital Cross-Connect Systems with Network Control & Management", GLOBECOM '87.
J. M. Spinelli, R. G. Gallager, "Event Driven Topology Broadcast without Sequence Numbers", IEEE Trans. on Commun., vol. 37, pp. 468-474, 1989.
R. Perlman, "Faulk-Tolerant Broadcast of Routing Information", Comput. Networks, vol. 7, pp. 395-405, 1983.
J. M. McQuillan, I. Richer, E. C. Rosen, "The New Routing Algorithm for the ARPANET", IEEE Trans. Commun., vol. COM-28, pp. 711-719, 1980.
Y. Afek, B. Awerbuch, E. Gafni, "Applying Static Ntwrk. Protocols to Dynamic Ntwrks.", Proc. 28th IEEE Symp. on Foundations of Computer Science, pp. 358-370, Oct. 1987.
T. H. Wu, D. J. Kolar, R. H. Cardwell, "Survivable Ntwrk. Archit. for Broadband Fiber Optic Ntwrks.: Model & Performance Comparisons", IEEE J. Lightwave Tech., vol. 6, pp. 1698-1709, 1988.
W. D. Grover, "The Self-Healing Ntwrk: A Fast Distributed Restoration Technique for Ntwrks. Using Digital Crossconnect Machines", IEEE/IEICE Global Telecomm. Conf., pp. 28.2.1-28.2.6, Tokyo, Dec., 1987.
C. H. Yang, S. Hasegawa, "Fitness: Failure Immunization Tech. for Ntwrk. Svc. Survivability", IEEE Global Telecomm. Conf., pp. 47-3.1-47.3.6, Hollywood, Fla., Nov./Dec., 1988.
T. C. Hu, "Combinatorial Algorithms", Addison-Wesley, Reading, Mass, 1982, pp. 82-83.

Primary Examiner—Douglas W. Olms
Assistant Examiner—Min Jung
Attorney, Agent, or Firm—Leonard Charles Suchyta

[57] ABSTRACT

A method for reconfiguring a telecommunications network comprising a plurality of reconfigurable crossconnect nodes interconnected by links when a failure event occurs is disclosed. The method comprises storing at each node a precomputed configuration table corresponding to each of a plurality of possible network topologies which can result from a plurality of possible failure events. After a specific failure event occurs, the network is flooded with messages so that each of the nodes is informed as to the specific existing topology of the network resulting from the specific failure event. The nodes are then reconfigurated in accordance with the precomputed configuration tables which correspond to the specific existing network topology.

14 Claims, 14 Drawing Sheets

DESIRED LOGICAL CONNECTIONS

|   | W | X | Y | Z |
|---|---|---|---|---|
| W | 0 | 1 | 0 | 1 |
| X | 1 | 0 | 1 | 1 |
| Y | 0 | 1 | 0 | 1 |
| Z | 1 | 1 | 1 | 0 |

| TABLE AT NODE A | | TABLE AT NODE B | | TABLE AT NODE C | | TABLE AT NODE D | |
|---|---|---|---|---|---|---|---|
| W,1 | 2,1 | 2,1 | X,1 | 3,2 | Y,1 | 1,1 | Z,2 |
| W,2 | 1,1 | X,2 | 5,1 | Y,2 | 4,2 | 5,1 | Z,1 |
| | | X,3 | 3,2 | | | 4,2 | Z,3 |

| TABLE AT NODE A | | TABLE AT NODE B | | TABLE AT NODE C | | TABLE AT NODE D | |
|---|---|---|---|---|---|---|---|
| W,1 | 2,1 | 2,1 | X,1 | 3,2 | Y,1 | 4,1 | Z,2 |
| W,2 | 2,2 | X,2 | 5,1 | Y,2 | 4,2 | 5,1 | Z,1 |
| | | X,3 | 3,2 | 3,1 | 4,1 | 4,2 | Z,3 |
| | | 2,2 | 3,1 | | | | |

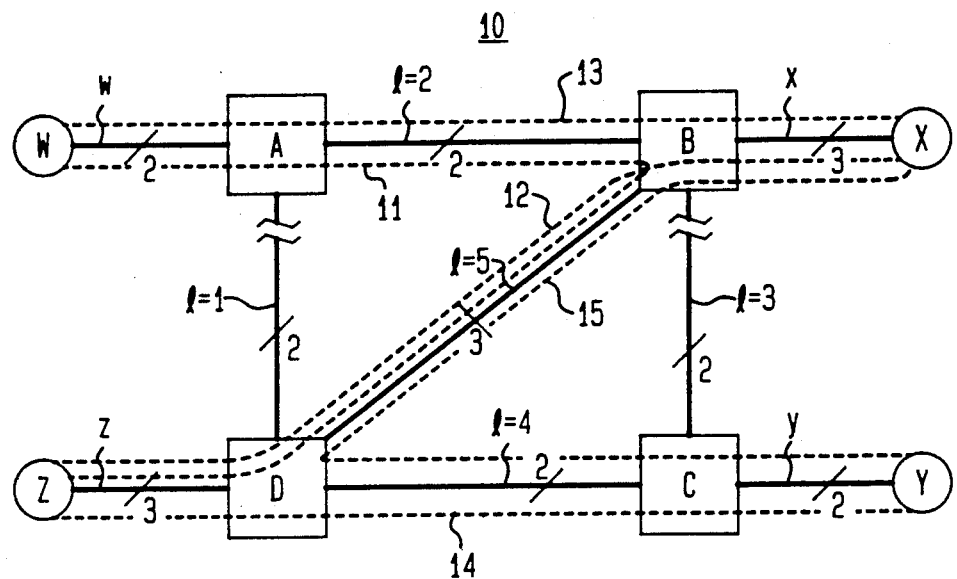

CONFIGURATION
TABLE LOADED
AT THIS NODE

Ⓝ = NORMAL CASE
   TABLE

① = TABLE FOR
    LINK 1 FAILURE

①/② = TABLE FOR LINK
    1 AND 2 SIMULTANEOUS
    FAILURE
    ETC.

FIG. 10
(KEY)
10

LINKS ARRAY AT THIS NODE. ■ MEANS DOWN.

LOCAL NAME OF LINK

GLOBAL NAME OF LINK

LINK FAILURE

MESSAGE IN TRANSIT ON LINK

VALUES OF DEGREE AND MAP FOR THIS NETWORK

DEGREE (A) = 2
DEGREE (B) = 3
DEGREE (C) = 2
DEGREE (D) = 3

MAP (A, 1) = 1
MAP (A, 2) = 2

MAP (B, 1) = 2
MAP (B, 2) = 3
MAP (B, 3) = 5

MAP (C, 1) = 3
MAP (C, 2) = 4

MAP (D, 1) = 1
MAP (D, 2) = 5
MAP (D, 3) = 4

A CIRCLE HERE INDICATES NEXT LINK TO BE SCANNED BY THIS NODE

INITIAL STATE (NODE A TAKES NEXT STEP)

STATE AFTER NODE A'S STEP (LINK 3 ABOUT TO FAIL)

STATE AFTER LINK 3 FAILS (NODE B TAKES NEXT STEP)

STATE AFTER NODE B'S STEP (NODE C TAKES NEXT STEP)

STATE AFTER NODE C'S STEP (NODE D TAKES NEXT STEP)

STATE AFTER NODE D'S STEP (LINK 1 ABOUT TO FAIL)

STATE AFTER LINK 1 FAILS (NODE A TAKES NEXT STEP)

STATE AFTER NODE A'S STEP (NODE B TAKES NEXT STEP)

STATE AFTER NODE B'S STEP
(NODE C TAKES NEXT STEP)

STATE AFTER NODE C'S STEP
(NODE D TAKES NEXT STEP)

STATE AFTER NODE D'S STEP
(NODE A TAKES NEXT STEP)

STATE AFTER NODE A'S STEP
(NODE B TAKES NEXT STEP)

STATE AFTER NODE B'S STEP
(NODE C TAKES NEXT STEP)

STATE AFTER NODE C'S STEP
(NODE D TAKES NEXT STEP)

STATE AFTER NODE D'S STEP
(NODE A TAKES NEXT STEP)

STATE AFTER NODE A'S STEP
(NODE B TAKES NEXT STEP)

STATE AFTER NODE B'S STEP
(NODE C TAKES NEXT STEP)

STATE AFTER NODE C'S STEP
(NODE D TAKES NEXT STEP)

STATE AFTER NODE D'S STEP
(NODE A TAKES NEXT STEP)

STATE AFTER NODE A'S STEP
(NODE B TAKES NEXT STEP)

STATE AFTER NODE B'S STEP (NODE C TAKES NEXT STEP)

STATE AFTER NODE C'S STEP (NODE D TAKES NEXT STEP)

STATE AFTER NODE D'S STEP (NODE A TAKES NEXT STEP)

STATE AFTER NODE A'S STEP (NODE B TAKES NEXT STEP)

STATE AFTER NODE B'S STEP
(NODE C TAKES NEXT STEP)

STATE AFTER NODE C'S STEP
(NODE D TAKES NEXT STEP)

STATE AFTER NODE D'S STEP
(NODE A TAKES NEXT STEP)

STATE AFTER NODE A'S STEP
(NODE B TAKES NEXT STEP)

STATE AFTER NODE B'S STEP (NODE C TAKES NEXT STEP)

STATE AFTER NODE C'S STEP (NODE D TAKES NEXT STEP)

STATE AFTER NODE D'S STEP (NODE A TAKES NEXT STEP)

STATE AFTER NODE A'S STEP (NODE B TAKES NEXT STEP)

DISTRIBUTED PROTOCOL FOR IMPROVING THE SURVIVABILITY OF TELECOMMUNICATIONS TRUNK NETWORKS

FIELD OF THE INVENTION

The present invention relates to a distributed protocol for maintaining the call carrying capacity of a reconfigurable trunk network after the failure of one or more network components.

BACKGROUND OF THE INVENTION

A trunk network illustratively comprises a plurality of node interconnected by transmission links. Two technological advances have had a substantial impact on the trunk network. These ar the extensive deployment of high-bandwidth fiber optic transmission links and the deployment of reconfigurable digital cross-connect nodes. (See, e.g., Rodney J. Boehm, et al, "Standardized Fiber Optic Transmission Systems - A Synchronous Optical Network View", IEEE Journal on Selected Areas in Comm., Vol. SAC-4, No. 9, December 1986; Satoshi Hasegawa et al, "Dynamic Reconfiguration of Digital Cross-Connect Systems With Network Control and Management", GLOBECOM '87) Typically, each reconfigurable digital cross-connect node includes a digital cross-connect switch and configuration table which determines how the links incident to the node are interconnected by the cross-connect switch.

The new technologies have increased the need for survivability strategies in the event of the failure of one or more network components. In particular, the aggregation of traffic which has been accelerated by the deployment of high-bandwidth fiber-optic transmission links has increased the amount of damage which can be caused by a single failure. The accidental severing of a single fiber-optic cable can disrupt tens of thousands of connections. Fortunately, the deployment of reconfigurable digital cross-connect nodes together with the abundant capacity of fiber links greatly increases the ability of a trunk network to recover from failure events. After a fiber-optic cable has been cut or a digital cross-connect node fails, it is possible to use the surviving nodes to reconfigure the network to restore much of the lost call-carrying capacity.

In view of the foregoing, it is an object of the present invention to provide a distributed protocol for maintaining the call-carrying capacity of a telecommunications trunk network after the failure of certain network components. In particular, it is an object of the present invention to provide a distributed protocol which is executed at each node of a trunk network comprising high-bandwidth optical fiber links and reconfigurable digital cross-connect nodes for maintaining the call-carrying capacity of the network in the event of a single or multiple node or link failure.

SUMMARY OF THE INVENTION

In a preferred embodiment, the inventive protocol comprises storing at each node a precomputed configuration table corresponding to each of a plurality of possible network topologies (i.e. network configurations) which result from a plurality of possible failure events. After a specific failure event occurs, the network is selectively flooded with messages so that each of the nodes is informed as to the specific existing topology of the network which results from the specific failure event. The nodes are then reconfigured in accordance with the specific prestored configuration tables which correspond to the specific existing network topology.

In short, the protocol of the present invention combines a system which enables the network nodes to agree on the network topology in the event of a failure with a system for reconfiguring the network by loading precomputed configuration tables at the nodes to maintain the call-carrying capacity of the network.

The problem of causing nodes in a network to agree on the network topology has previously been studied (see, e.g., J. M. Spinelli and R. G. Gallager, "Event Driven Topology Broadcast Without Sequence Numbers", IEEE *Trans. on Commun.*, Vol. 37, pp. 468-474, 1989; R. Perlman, "Fault-tolerant Broadcast of Routing Information," *Comput. Networks*, Vol. 7, pp. 395-405, 1983; J. M. McQuillan, I. Richer, and E. C. Rosen, "The New Routing Algorithm for the ARPANET," IEEE *Trans. Commun.*, Vol. COM-28, pp. 711-719, 1980; Y. Afek, B. Awerbuch, and E. Gafni, "Applying Static Network Protocols to Dynamic, Networks," In *Proc. 28th IEEE Symp. on Foundations of Computer Science*, pp. 358-370, October 1987). Similarly, configuration tables for digital cross-connect nodes have heretofore been designed. However, no one has heretofore provided a distributed protocol for maintaining the call-carrying capacity of a network in the event of a failure, which distributed protocol utilizes a system for enabling the network nodes to agree on a network topology in combination with the loading at each node of a particular precomputed configuration table depending on the particular failure to reconfigure the network.

One alternative approach to network survivability involves the designing of low cost multiply connected networks (see e.g., T. H. Wu, D. J. Kolar, and R. H. Cardwell, "Survivable Network Architecture for Broadband Fiber Optic Networks: Model and Performance Comparisons," IEEE *J. Lightwave Tech.*, Vol. 6, pp. 1698-1709, 1988). Fault tolerance is improved in these networks because there are alternative links and a protection switching strategy to make use of these alternative links. The reconfiguration protocol of the present invention is complementary to these techniques in that both can be used in the same network.

Other distributed approaches to network survivability (see, e.g, W. D. Grover, "The Self-Healing Network: A Fast Distributed Restoration Technique for Networks Using Digital Crossconnect Machines," In IEEE/IEICE *Global Telecomm. Conf.*, pp. 28.2.1-28.2.6, Tokyo, December 1987; C. Han Yang and S. Hasegawa, "FITNESS: Failure Immunization Technology for Network Service Survivability," In IEEE *Global Telecomm. Conf.*, pp. 47-3.1-47.3.6, Hollywood, Fla, November/December 1988) do not make use of precomputed configuration tables. These approaches seek to devise a reconfiguration plan in real time after a failure event has occurred. These techniques have several shortcomings. The plans that are devised deviate quite a bit from the optimal. In addition, these techniques require a large amount of activity in the critical interval from a failure event to the reconfiguration of the network, thus delaying the restoration of service.

The reconfiguration protocol of the present invention overcomes these weaknesses of the prior art survivability techniques by utilizing precomputed and therefore superior configuration tables rather than a sub-optional reconfiguration plan developed in real time. In addition, by utilizing precomputed configuration tables, the present invention significantly reduces the amount of computation required in the critical interval between failure and network reconfiguration. Thus, in the present invention, an increase in memory requirements at the nodes is traded off for a reduction in the amount of computation that must be done in the critical interval after the occurrence of a failure event.

After a component of the trunk network fails, physical repairs can take several hours or more. In contrast, the protocol of the present invention can reconfigure a trunk network in tens of milliseconds. The role of the inventive protocol is to provide the best possible service in the interval from a failure event to the return to normal operation.

BRIEF DESCRIPTION OF THE DRAWING

FIGS. 5, 7, and 9A show configuration tables for particular link failures in the network of FIGS. 1 and 3.

FIGS. 6, 8, and 9B show how the logical connections of FIG. 3 are rerouted using the configuration tables of FIGS. 5, 7, and 9A, respectively.

FIGS. 10-42 illustrate the execution of a distributed protocol for maintaining the call carrying capacity of the network in the event of a failure, in accordance with an illustrative embodiment of the present invention.

DETAILED DESCRIPTION OF THE INVENTION

Figures 1, 2:
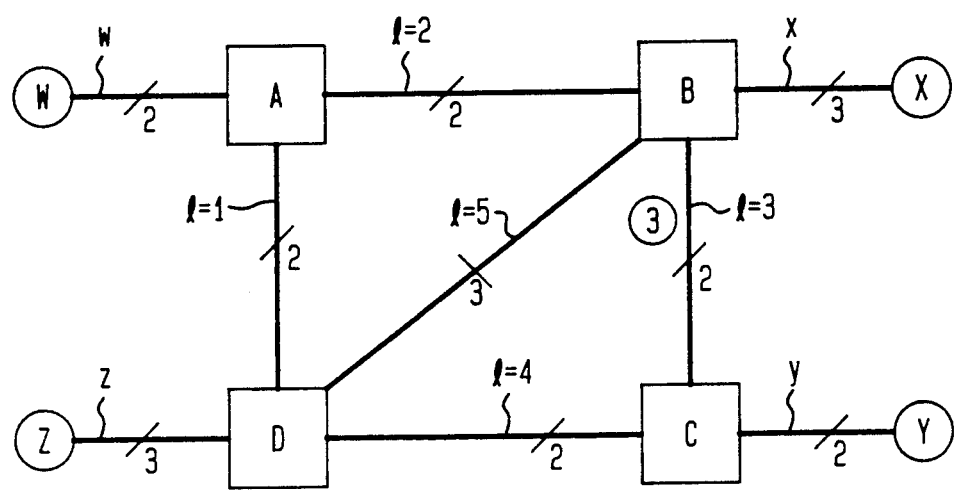
FIG. 1 schematically illustrates an example of a trunk network comprising a plurality of reconfigurable cross-connect nodes interconnected by links.
FIG. 2 is a chart which defines a set of possible logical connections for the network of FIG. 1.

FIG. 1 schematically illustrates a telecommunication network 10. The network 10 comprises a plurality of reconfigurable cross-connect nodes A, B, C, D. The nodes are interconnected by the physical links $l=1,2,3,4,5$. In FIG. 1, the capacity of each link is noted. For example, the capacity of the link $l=5$ is three channels. The network 10 also includes the central offices W,X,Y,Z. The central offices W,X,Y and Z are connected to the corresponding nodes A,B,C, and D, by the links w,x,y, and z, respectively.

The network 10 is used to set up a plurality of logical connections between pairs of central offices. Each logical connection starts at one central office, passes through one or more nodes and physical links and terminates at a second central office. Typically, each logical connection can be routed over a variety of possible paths in the network. In general, the number of logical connections passing through any physical link should not exceed the capacity (i.e. the number of channels) in the physical link. In the event of a network failure such as the failure of one or more links, the nodes A,B,C, and D are reconfigured to preserve as many of the logical connections as possible.

Thus, in the network 10 there are two layers: a physical layer which comprises the nodes and the links which connect them, and a logical layer which comprises the logical connections routed through the physical network. A logical network (i.e. a particular set of logical connections) is established by the nodes by the way they interconnect the channels on the physical links incident thereto. The pattern of cross connections at each node is stored in a configuration table. A particular logical network is established when a consistent set in configuration tables is loaded at all of the nodes. Generally, there are many possible sets of configuration tables which can be utilized to define the same logical network.

FIG. 2 is a chart which defines a set of logical connections which may be set up in the network 10. In the chart of FIG. 2, an integer such as "1" indicates the presence of a particular number of logical connections between a specific pair of central offices and a "0" indicates the absence of such a logical connection. For example, the first line of the chart of FIG. 2 indicates that there is one logical connection between the central offices W,Z but no logical connection between the central offices W,Y.

Figures 3, 4:
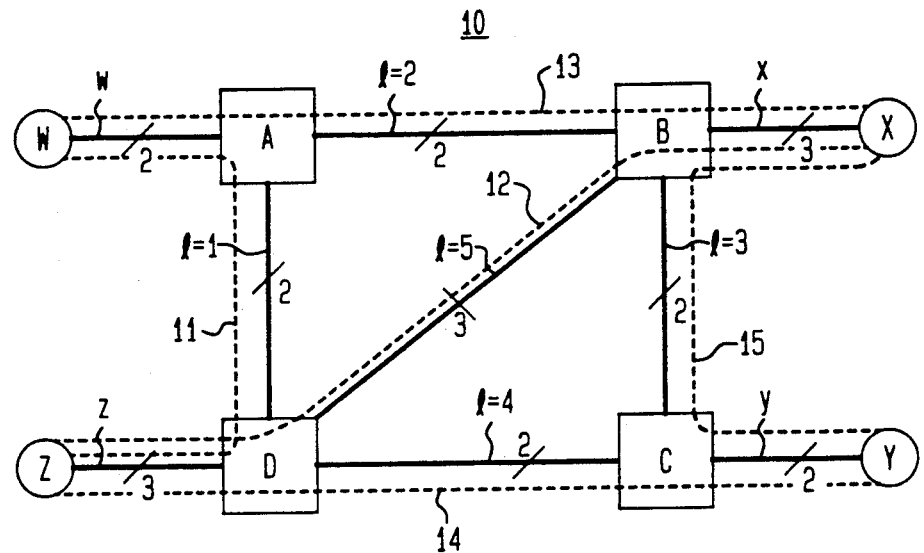
FIG. 3 shows the network of FIG. 1 including the logical connections defined by the chart of FIG. 2.
FIG. 4 shows the configuration tables used at the nodes to obtain the logical connections of FIGS. 2 and 3.

The network 10 of FIG. 1 is shown again in FIG. 3. In FIG. 3, the logical connections defined by the chart of FIG. 2 are also schematically illustrated. In FIG. 3, the logical connection between W and Z is labeled 11 and the logical connection between Z and X is labeled 12. The logical connection from W to X is labeled 13, the logical connection from Z to Y is labeled 14, and the logical connection from X to Y is labeled 15.

As indicated above, each node includes a configuration table which defines how the physical links incident thereto are interconnected to form a particular set of logical connections. FIG. 4 shows the configuration tables for the nodes A, B, C and D which are used to form the logical connections of FIGS. 2 and 3. The configuration tables of FIG. 4 are based on the assumption that all network components including all the links and all the nodes are operating properly. The configuration tables of FIG. 4 may be read as follows. Each line of a configuration table represents a connection between a channel of one physical link and a channel of another physical link. For example, the top line of the table at node A defines a connection between link w, channel 1, and link $l=2$, channel 1. As shown in FIGS. 1 and 3, link w has a capacity of two channels and link $l=2$ has a capacity of two channels. The second line of the table at node A defines a connection between link w, channel 2, and link $l=1$, channel 1. Similarly, the top line of the table at node D defines a connection between link $l=1$, channel 1, and link z, channel 2.

In addition to the above-described configuration tables which are loaded at the nodes A,B,C, and D, certain information is required at the central offices. Each central office stores the channel on which each of its logical connections terminates. For example, the central office W stores the information that the logical connection to the central office X leaves on channel 1 of link w and that the logical connection to the central office Z leaves on channel 2 of link w. This information is not changed after a failure or reconfiguration.

As indicated above, the present invention is a scheme for reconfiguring a physical network to maintain a certain set of logical connections in the event of a failure event comprising the failure of one or more physical components. The scheme has two parts, first the network is selectively flooded with messages so that all of the nodes agree on the specific failure event which has occurred (i.e. the nodes agree on the specific existing network topology), and then each node is reconfigured by installing a specific precomputed configuration table corresponding to the specific failure event.

To carry out the inventive method it is necessary to identify those failures for which configuration tables will be computed (these are called covered failures). For each covered failure, each node stores a precomputed configuration table. The decision as to which failures should be covered is an engineering tradeoff. The desire for as much coverage as possible must be balanced against the cost of computing and storing a large number of configuration tables.

One possibility is to provide precomputed configuration tables at the nodes for all possible single link failures. Then, if a single link failure occurs, the nodes are reconfigured in accordance with the specific precomputed configuration tables for the specific single link failure. If the network has a failure which is not a single link failure, e.g., a multi-link failure, then all the nodes should use a consistent rule to select particular configuration tables from those that are stored at the nodes. One possible rule is to install the configuration table that corresponds to the highest numbered link that is down, assuming a fixed numbering of all the links in the network. In this case, the technique of the present invention works at least as well and generally better than doing nothing.

An alternative embodiment of the invention involves the computation and storage of configuration tables for all possible single link failures and the most probable multi-link failures. An example of a likely multi-link failure is the loss of all optical fiber links which run in a single conduit or the loss of all nodes and links in a single building. The failure of any nod is represented by the failure of all links incident to that node.

A further alternative embodiment of the invention involves the computation and storage of configuration tables for all possible single link failures and all possible multiple link failures. In this case, the failure of any combination of links is covered as is the failure of any combination of nodes. The tradeoff of course is that a large number of configuration tables needs to be computed for this embodiment and a large amount of storage is required for the configuration tables at each node.

Algorithms such as linear programming algorithms for computing configuration tables are disclosed in T. C. Hu, "Combinatorial Algorithms", Addison-Wesley, Reading, Mass., 1982, pages 82-83. A collection of configuration tables is constructed as follows: First, configuration tables are provided under the assumption that all components (i.e. physical links and nodes) are operating correctly. Then configuration tables are produced for each covered failure event. For any covered failure event, the logical connections unaffected by the failure are left undisturbed. Spare capacity on the surviving links is used to find new routes for those logical connections which have been disconnected by the failure. Each set of configuration tables (one set for the normal case and one set for each covered failure) may be obtained using an algorithm of the type mentioned above.

It is useful to present a rule of thumb for the amount of spare capacity required on each link to ensure 100% recovery from any single link failure. The required spare capacity as a percent of link utilization is $100/c-1$, where the connectivity c is defined to be the minimum over all pairs of nodes of the number of edge-disjoint paths between those two nodes. If $c=1$, then it is not possible to ensure 100% recovery from any single line failure.

Figures 5, 6:
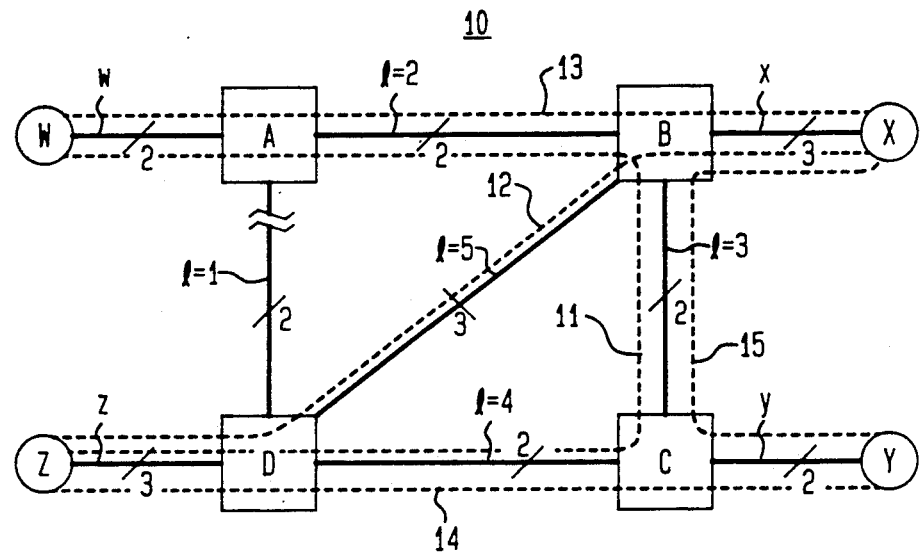
Figures 7, 8:
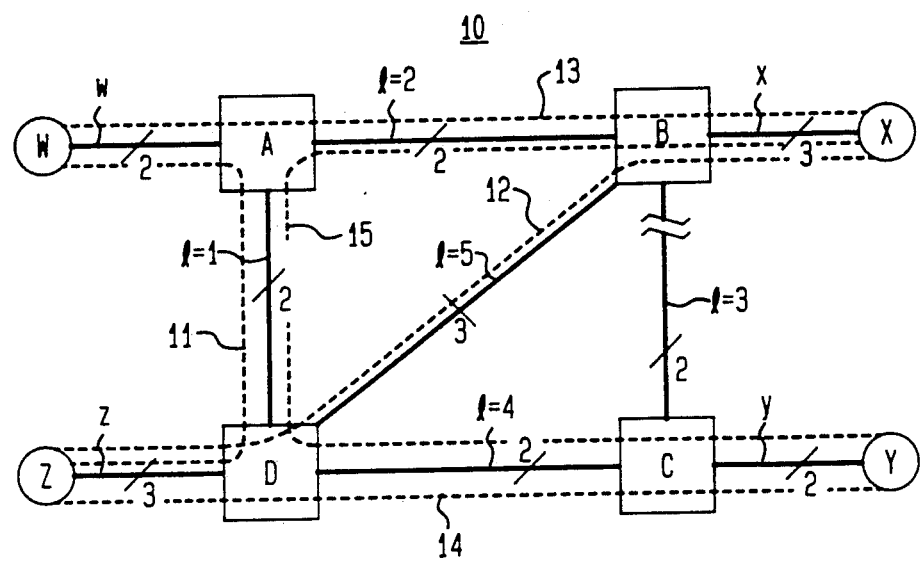

Some configuration tables for the network 10 of FIGS. 1 and 3 are now considered. FIG. 5 shows the precomputed configuration tables which are loaded at the nodes A, B, C, and D when the physical link $l=1$ of the network 10 fails. FIG. 6 shows how the configuration tables of FIG. 5 reconfigure the network to reroute the logical connection 11 between W and Z which previously utilized the failed link $l=1$. The logical connection 12 between Z and X, the logical connection 13 between W and X, the logical connection 14 between Z and Y and the logical connection 15 between X and Y remain unchanged by the reconfiguration since these logical connections do not utilize the link $l=1$. Similarly, FIG. 7 shows the precomputed configuration tables which are loaded at the nodes A, B, C, and D to reconfigure the network when the failure event is the failure of the physical link $l=3$. The rerouting of the logical connection 15 between X and Y which previously utilized the link $l=3$ is shown in FIG. 8. The logical connections 11, 12, 13, and 14 are not rerouted. In addition, FIG. 9A shows the precomputed configuration tables which are loaded at the nodes A, B, C, and D when links $l=1$ and $l=3$ both fail. The rerouting of the logical connections 11 and 15 is shown in FIG. 9B. In all of the three illustrative failure events described above, spare capacity on the surviving links is used to maintain the set of logical connections.

In accordance with the present invention, in order for the nodes to load the proper configuration tables when there is a failure event, the network is selectively flooded with messages so that all of the nodes are informed of the failure event and have a consistent view of the existing network topology which results from the failure event. All the nodes are then able to load appropriate configuration tables so that the network is reconfigured consistently.

To accomplish this, each node continuously executes the following protocol:

```
let l be the label of this node
for l = 1 to L
LINKS(l) = UP
end for
Main Driving Loop:
while true do
for d = 1 to DEGREE(n)
if LINKS(MAP(n,d)) = UP then
if not WORKING (d) then
call UPDATE(MAP(n,d))
else
m = RECEIVE(d)
if m ≠ NULL then
call UPDATE(m)
end if
end if
end if
end for
end while
Subroutine:
procedure: UPDATE(b)  % b is the label of a link that is down
if LINKS(b) = UP then
LINKS(b) = DOWN
for d = 1 to DEGREE(n)
SEND(d,b)
end for
t = SELECT(LINKS)
install configuration table determined by t
end if
end procedure
```

The protocol makes use of one array, three functions and three primitive procedures.

There are L links in the trunk network. Each link is given a label l, $1 \leq l \leq L$. Each node running the protocol maintains an L-element array LINKS, each of whose elements LINKS (l) is either UP or DOWN. The purpose of this array is to enable each node to track the state of the network. Initially, all elements of a LINKS array are UP. While the network topology is changing, the LINKS array may give an inaccurate or outdated picture of the network. However, when the topology of the network stops changing, the protocol causes all the LINKS arrays of all the nodes to converge to the same value.

One function utilized in the protocol is DEGREE(n). For any node n, the value of DEGREE(n) is the number of links incident to node n.

A second function utilized in the protocol is MAP(n,d). The value of MAP(n,d) is the label l of the d-th link incident to node n, where the links incident to the node n have been given some arbitrary local identification number $d, 1 \leq d \leq DEGREE(n)$. Thus, the MAP function serves to convert between a local labeling of a link (i.e., d) incident to a node and the global network-wide labeling of the link (i.e., l). For example, in FIG. 10, MAP(n=C,d=1)=3 and MAP(n=C,d=2)=4.

A third function used in the protocol is SELECT-(LINKS). As indicated above, the LINKS array is used to represent the state of the network after a failure event. The SELECT function maps each possible state of the LINKS array (i.e. each possible failure event) into the precomputed configuration table which should be used if that failure event happens. If LINKS=F is a covered failure, SELECT(F) should be the configuration table for failure F. If LINKS=F is not a covered failure, SELECT(F) should be the configuration table for some failure F', where F' is a maximal subset of F for which a precomputed configuration table exists.

The primitive procedures used in the protocol are SEND, RECEIVE and WORKING. At a node n, these procedures operate as follows. The procedure SEND(d,b) sends the message b via the link d incident to node n, i.e. the message b is placed in the buffer at the node at the far end of link d. The message b is the label of a link that is down. The message b is lost if the link d fails before the message b is delivered.

If the link d is up, the procedure RECEIVE(d) returns the first message in a buffer associated with the link d or NULL if there is no message.

The procedure WORKING(d) returns logical true if d is up, otherwise it returns logical false. Thus, the procedure WORKING(d) is used to determine whether the link d is up or down. In other words WORKING(d) is used to determine the true physical state of the link d not merely the corresponding entry in the LINKS array. This may be accomplished using hardware which forms part of the digital cross-connect switch at the node.

The operation of the protocol may be described as follows. At each node, a LINKS array is maintained indicating the status of all the links l in the network. At each node, a plurality of predetermined configuration tables are stored corresponding to a plurality of possible failure events.

At each node, all of the links associated with the node which are indicated by the LINKS array to be up are tested using the WORKING procedure.

If, as a result of the testing step at a node, a specific link is determined to be down: (1) the LINKS array is updated, (2) the SEND procedure is used to send a message on the links incident to the node indicating that the specific link is down, and (3) the SELECT function is used to choose a configuration table for reconfiguring the node. These three steps are carried out in an UPDATE subroutine of the protocol which is called when the WORKING procedure indicates the specific link is down.

If a specific link is determined as a result of the WORKING procedure to be up, the RECEIVE procedure is used to determine if a message has been received via the specific link indicating that another link in the network is down. If a message has been received via the specific link indicating that another link in the network is down, and the LINKS array does not already indicate that the other link is down, then: (1) update the LINKS array, (2) use the SEND procedure to send a message on all links incident to the node indicating that the other link is down, and (3) use the SELECT function to choose a configuration table corresponding to the updated LINKS array for reconfiguring the node.

The illustrative reconfiguration protocol set forth above is continuously executed by each of the nodes. Briefly stated, each node examines each of its incident links in turn, skipping those links already known to be down. When a node looks at a link, two events of interest are directly detecting that a link is down or receiving a message on the link that another link is down. In either case, the node begins flooding the network with the information (if it is new).

Thus, an important mechanism used in the protocol is an intelligent flooding of the network with an announcement of each link failure. The number of messages sent per failure is limited because each node forwards information about each failure at most once. Thus, in the worst case, each link failure causes one message to be sent in each direction on each link in the network.

The following is an example of an execution of the foregoing protocol. The protocol works correctly no matter how the nodes interleave their steps. In the following example, an interleaving is shown wherein the nodes take their steps in round robin order, i.e., A,B,C,D; A,B,C,D.... At each step, each node makes one full pass through the FOR-LOOP in the main driving loop of the protocol, examining one of its incident links and taking any required action.

The example of the execution of the protocol in the network 10 of FIG. 1 is explained in connection with FIG. 11 to FIG. 42. FIG. 10 is a key which enables the reader to understand FIG. 11 to FIG. 42.

FIG. 10 shows the network 10 of FIG. 1 in greater detail. As indicated previously, the network 10 comprises the nodes A,B,C, and D. The nodes A,B,C,D are interconnected by the links l=1,2,3,4,5. Each node includes a LINKS array which indicates the up/down status of each of the links l=1,2,3,4,5. When a particular link identifying number is blackened in the LINKS array of a particular node, it means that the particular node has concluded that the corresponding link is down.

FIG. 10 also shows a configuration table currently loaded at each node, some of the various possible configuration tables being listed at the left-hand side of FIG. 10.

In addition, FIG. 10 schematically illustrates the format of a message being sent via the link l=1 from node A to node D, which message indicates the failure of the link l=3.

At the left-hand side of FIG. 10, the DEGREE(n) function (i.e. number of incident links) is evaluated for each of the nodes, and the MAP (n,d) function is evaluated to convert the local link labels $d = 1,2,3,\ldots$ into the global network link labels $l = 1,2,3,4,5$ for each node. When one of the local link labels is circled in the following FIGS. 11 to 42, it indicates that this is the next link to be scanned by the corresponding node.

Figure 11:
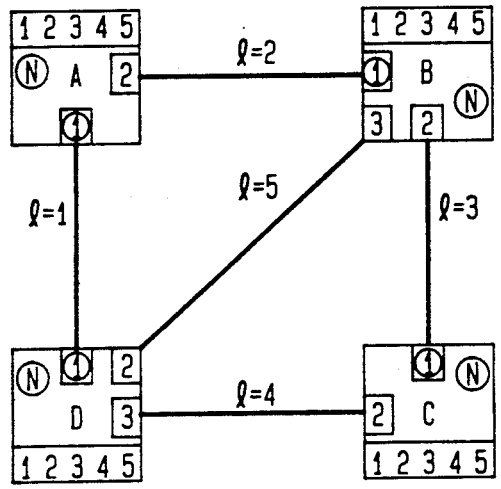
Figure 12:
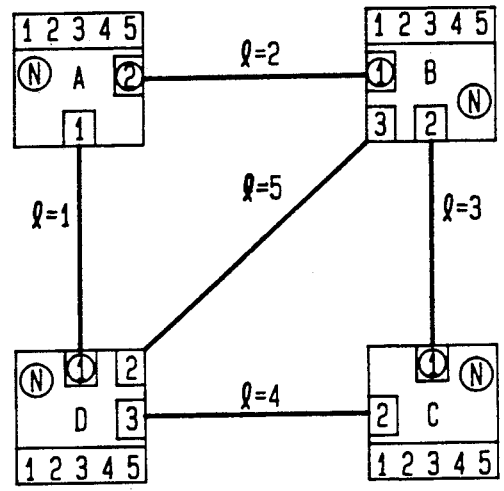

FIG. 11 shows the initial state of the network with all links up, all entries in all LINKS arrays UP, and with all of the nodes having their normal case configuration table. As indicated previously, in this example, the nodes scan their links in an interleaved fashion. As indicated in FIG. 11, the next node to take a step (i.e. scan a link) is node $n = A$. The link to be scanned at node $n = A$ is indicated by the circle to be the link $d = 1$ (local labeling scheme), corresponding to the link $l = 1$ (global labeling scheme). Since the entry for this link in the LINKS array is UP, the node A proceeds to test this link using the procedure WORKING. Since the result of this test is that the link is up, the node A attempts to receive a message on this link using the procedure RECEIVE. Since no message is available, the node A takes no action. The state of the network after node A takes its step is shown in FIG. 12. FIG. 12 also indicates that the next link to be scanned by the node A will be $d = 2$, corresponding to $l = 2$, but only after all the other nodes have scanned a link.

As indicated in FIG. 12, link $l = 3$ is about to fail. The state of the network after link $l = 3$ fails is shown in FIG. 13.

Figure 13:
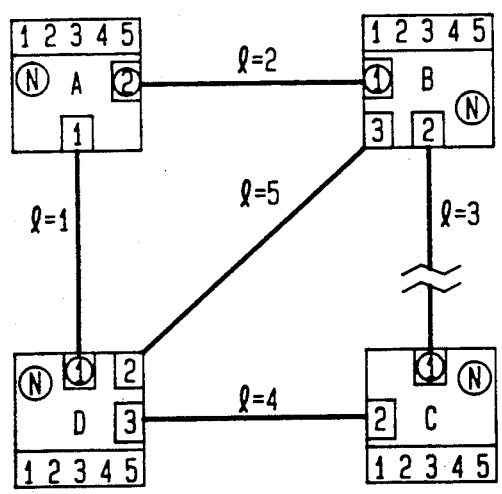

As indicated in FIG. 13, the next node to take a step is node B. The node B scans its link $d = 1$ corresponding to $l = 2$. Since the entry for this link in the LINKS array is UP, the node B proceeds to test this link using the procedure WORKING. Since the result of this test is that the link is up, the node B attempts to receive a message on this link using the procedure RECEIVE. Since no message is available, the node B takes no action. The state of the network after node B takes its step is shown in FIG. 14.

Figure 14:
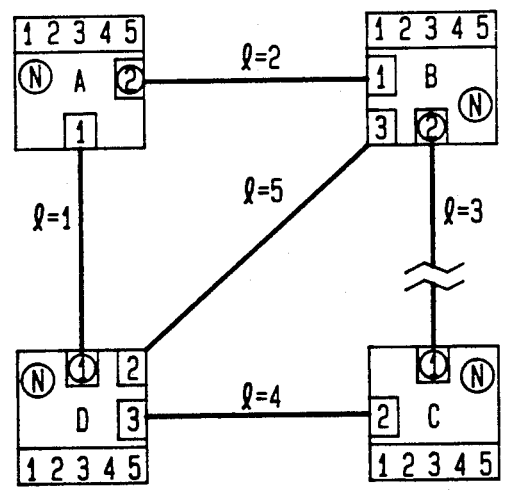
Figure 15:
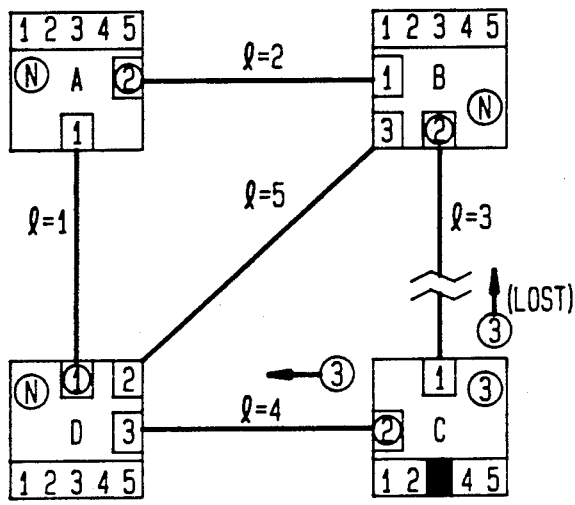

As indicated in FIG. 14, the next node to take a step is node C which scans its link $d = 1$ corresponding to $l = 3$. Since the entry for this link in the LINKS array is UP, the node C proceeds to test this link using the procedure WORKING. Since the result of this test is that the link has failed, the node C takes the required actions. These actions are shown in FIG. 15. In particular, the LINKS array at node C has been updated to indicate the failure of link $l = 3$. A message is sent on the links $l = 4$ and $l = 3$ incident to the node C indicating the link $l = 3$ has failed. (The message sent via link $l = 3$ is lost). In addition, a configuration table corresponding to the failed link $l = 3$ is loaded at the node $n = C$.

Figure 16:
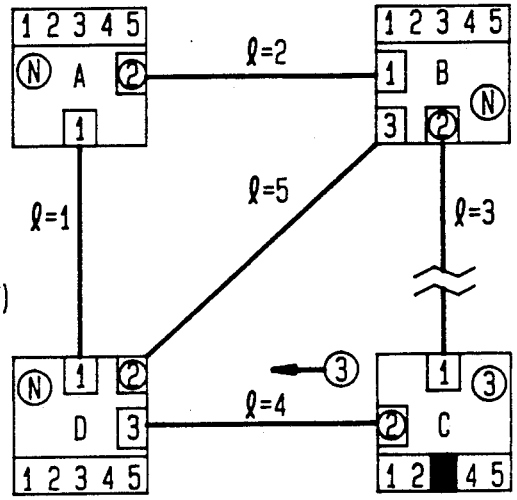
Figure 17:
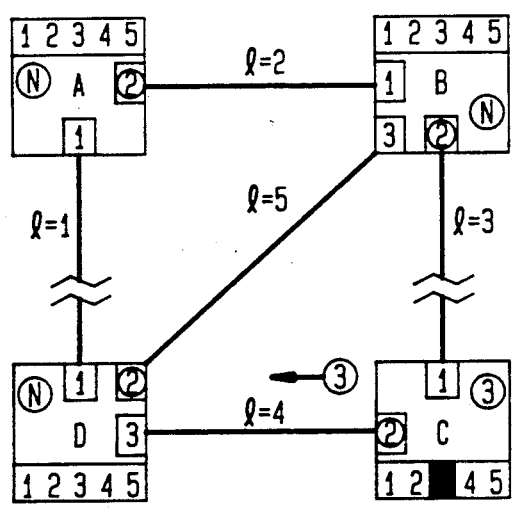

As indicated in FIG. 15, the next link to take as step is node D, which scans its link $d = 1$ corresponding to $l = 1$. Since the entry for this link in the LINKS array is UP, the node D proceeds to test this link using the procedure WORKING. Since the result of this test is that the link is up, the node D attempts to receive a message on this link using the procedure RECEIVE. Since no message is available, the node D takes no action. The state of the network after node D takes its step is shown in FIG. 16. As indicated in FIG. 16, after node D takes its step, the link $l = 1$ fails. The state of the network after the link $l = 1$ fails is shown in FIG. 17.

The next node to take a step is node A. As shown in FIG. 17, the next link to be scanned by the node A is its link $d = 2$, corresponding to $l = 2$. Since the entry for this link in the LINKS array is UP, the node A proceeds to test this link using the procedure WORKING. Since the result of this test is that the link is up, the node A attempts to receive a message on this link using the procedure RECEIVE. Since no message is available, the node A takes no action. The state of the network after the step by node A is shown in FIG. 18.

Figure 18:
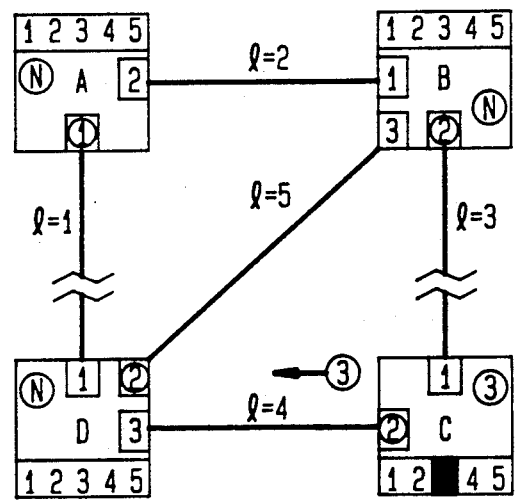
Figure 19:
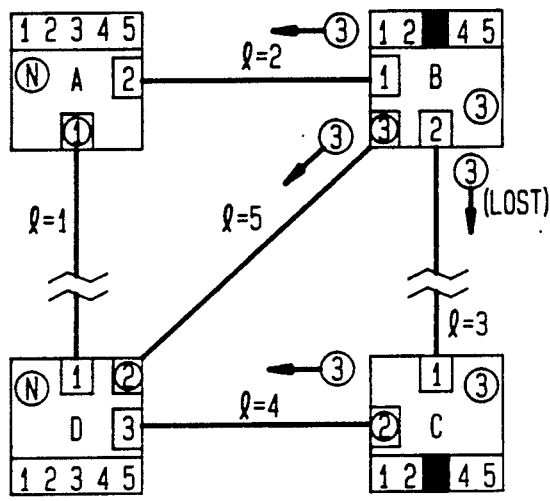

As indicated in FIG. 18, the next node to take a step is node B, which scans its link $d = 2$ corresponding to $l = 3$. Since the entry for this link in the LINKS array is UP, the node B proceeds to test this link using the procedure WORKING. Since the result of this test is that the link has failed, the node B takes the required actions. As shown in FIG. 19, the node B updates its LINKS array to indicate that the link $l = 3$ is down, it loads a new configuration table, and sends a message on all of its incident links that the link $l = 3$ is down, the message sent on the link $l = 3$ being lost.

As indicated in FIG. 19, the next node to take a step is node C, which scans its link $d = 2$ corresponding to $l = 4$. Since the entry for this link in the LINKS array is UP, the node C proceeds to test this link using the procedure WORKING. Since the result of this test is that the link is up, the node C attempts to receive a message on this link using the procedure RECEIVE. Since no message is available, the node C takes no action. (Note, the outgoing message on the link $l = 3$ has been sent in a previous step illustrated in FIG. 15). The state of the network after node C takes its step is shown in FIG. 20.

Figure 20:
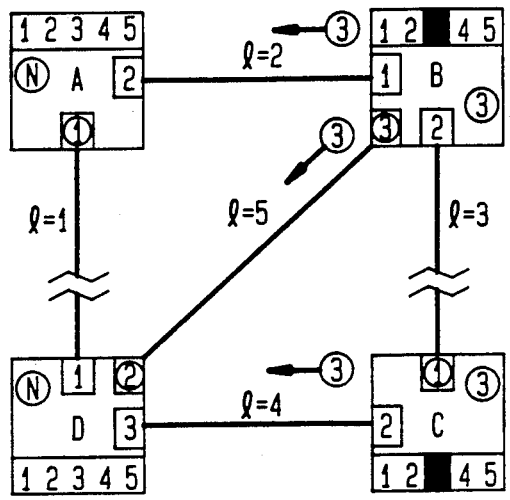

As indicated in FIG. 20, the next node to take a step is node D which scans its link $d = 2$ corresponding to $l = 5$. Since the entry for this link in the LINKS array is UP, the node D proceeds to test this link using the procedure WORKING Since the result of this test is that the link is up, the node D attempts to receive a message on this link using the procedure RECEIVE. This results in node D receiving a message indicating that the link $l = 3$ is down. Because this information is new to node D, the node D takes the following steps shown in FIG. 21. The node D updates its LINKS array to indicate that the link $l = 3$ is down, loads a new configuration table, and sends a message on all its incident links indicating that the link $l = 3$ is DOWN, the message which is sent on link $l = 1$ being lost.

Figure 21:
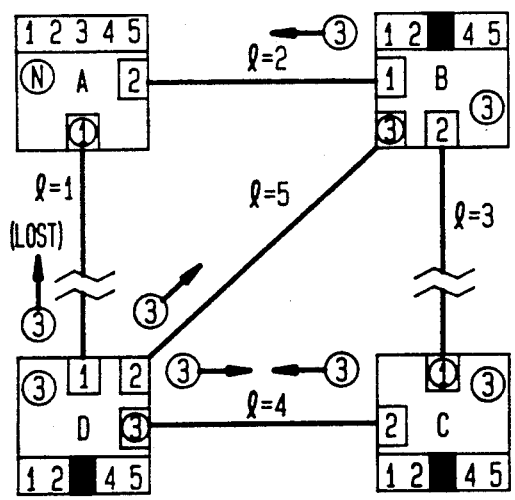

As indicated in FIG. 21, the next node to take a step is node A which scans its link $d = 1$ corresponding to $l = 1$. The node A detects that this link is down using the WORKING procedure and takes the required actions shown in FIG. 22. In particular, the node A updates its LINKS array, loads a new configuration table, and sends a message on all its incident links indicating that the link $l = 1$ is down, the message sent via link $l = 1$ being lost.

Figure 22:
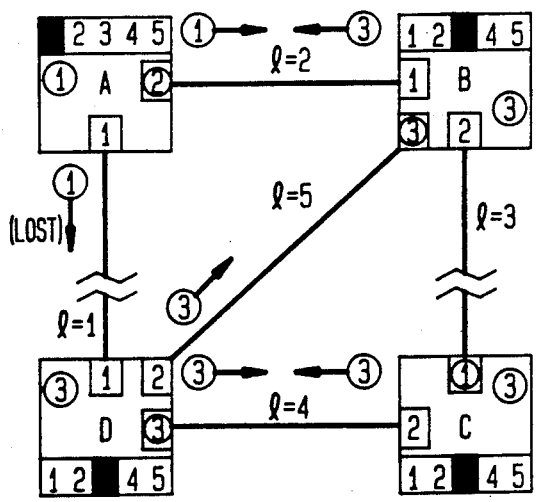

As indicated in FIG. 22, the next node to take a step is the node B, which scans its link $d = 3$ corresponding to $l = 5$. The node B detects that the link $l = 5$ is up using the WORKING procedure and receives a message that the link $l = 3$ is down using the RECEIVE procedure. However, because the node B already knows that the link $l = 3$ is down (this is indicated in its LINKS array), the node B takes no action. The state of the network after the step by node B is shown in FIG. 23.

Figure 23:
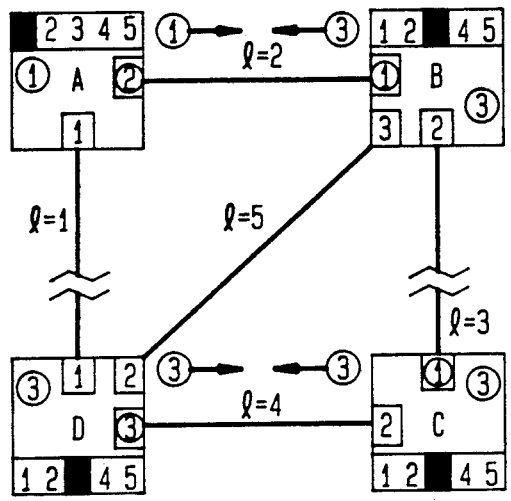

As indicated in FIG. 23, the next node to take a step is node C, which scans its link $d = 1$ corresponding to $l = 3$. Since the LINKS array at node C already indicates that this link is down, no action is taken by node C. The state of the network after node C's step is shown in FIG. 24.

Figure 24:
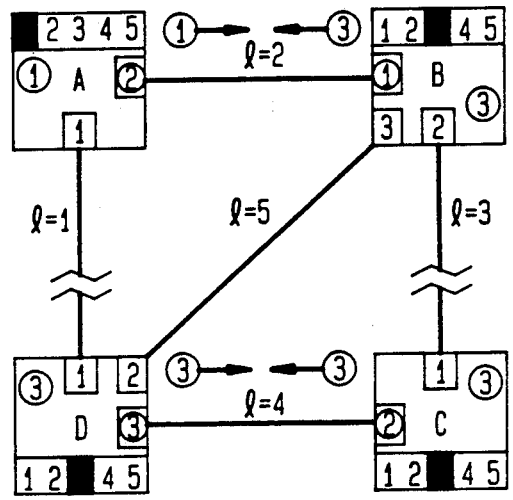

As indicated in FIG. 24, the next step is taken by node D which scans its link d=3 corresponding to l=4. The node D finds that the link l=4 is up and receives a message indicating that the link l=3 is down. Since the LINKS array at the node D already indicates that the link l=3 is down, no action is taken. The state of the network after node D's step is shown in FIG. 25.

Figure 25:
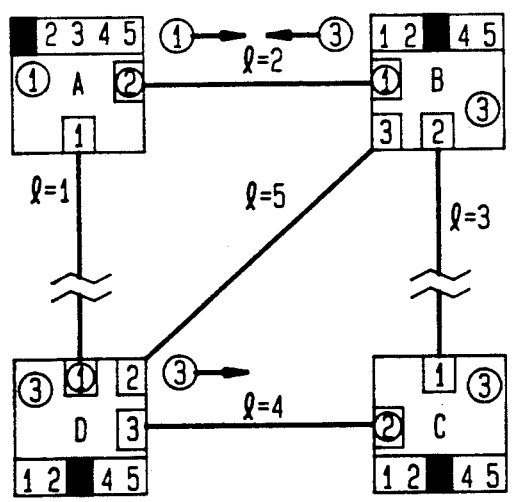
Figure 26:
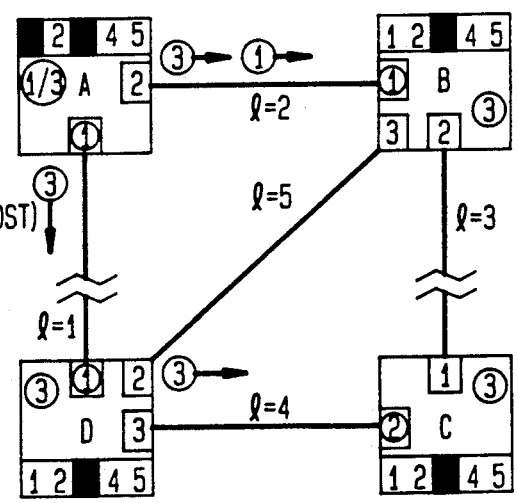

As indicated in FIG. 25, the next node to take a step is node A, which scans its link d=2 corresponding to l=2. The node A determines that the link l=2 is up and receives a message indicating that the link l=3 has failed. Since this information is new to node A, as shown in FIG. 26, the node A updates its LINKS array, loads a new configuration table which correspond to the failure of links l=1 and l=3 (see FIGS. 9A and 9B) and sends a message on its incident links indicating that l=3 is down. The message that is sent via l=1 is lost.

As indicated in FIG. 26, the next step is taken by node B which scans its link d=1 corresponding to l=2. The node B determines that this link is up and also receives the first message transmitted to it via l=2, which message indicates that l=1 is down. This information is new to node B, as it is not yet indicated in the LINKS array at node B. Accordingly, node B takes the following steps indicated in FIG. 27. Node B updates its LINKS array, loads a new configuration table as determined by the updated LINKS array, and sends a message that l=1 is down via all of its incident links, the message that is sent via l=3 being lost.

Figure 27:
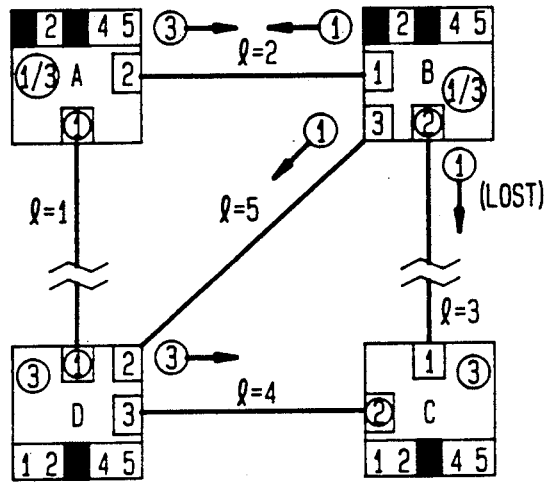

As indicated in FIG. 27, node C takes the next step by scanning its link d=2 corresponding to l=4. Node C determines that this link is up and receives a message indicating that the link l=3 is down. Because this is already indicated at the LINKS array at node C, no further action is taken. The state of the network after node C's step is indicated in FIG. 28.

Figure 28:
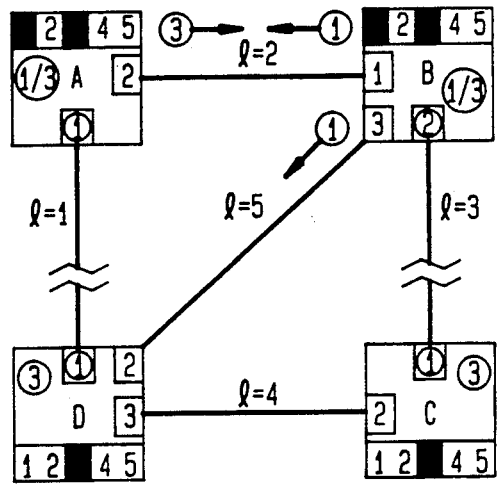

As indicated in FIG. 28, node D takes the next step by scanning its link d=1, corresponding to l=1. The node D determines for the first time that the link l=1 is down. Thus, as shown in FIG. 29, node D updates its LINKS array, loads a new configuration table, and sends a message on all its incident links indicating that l=1 is down, wherein the message that is transmitted via the link l=1 is lost.

Figure 29:
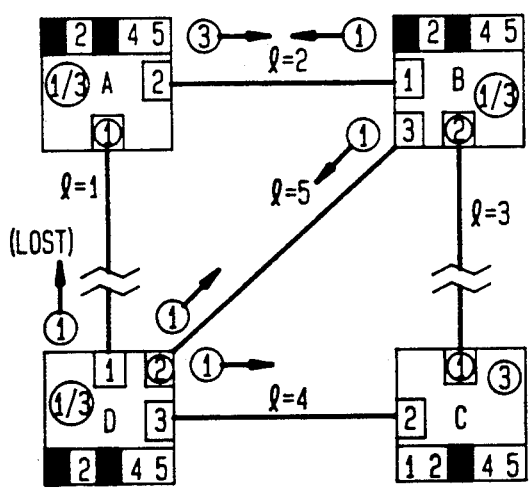

As indicated in FIG. 29, the next node to take a step is node A, which scans its link d=1 corresponding to l=1. Since the node A already knows that this link is down, the node A takes no action. The state of the network after node A's step is shown in FIG. 30.

Figure 30:
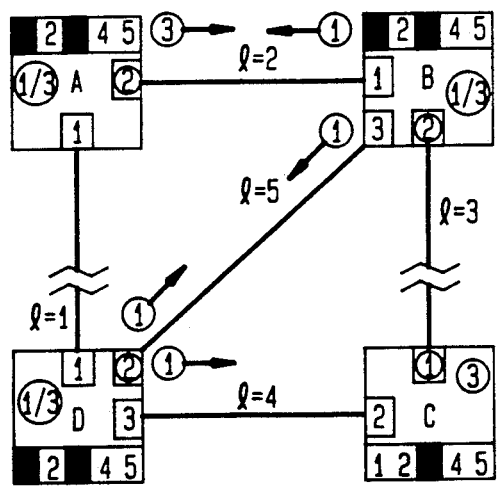

As indicated in FIG. 30, the next node to take a step is node B, scans its link d=2 corresponding to l=3. The node B already knows this link is down as indicated by its LINKS array so it takes no action. The state of the network after node B's step is shown in FIG. 31.

Figure 31:
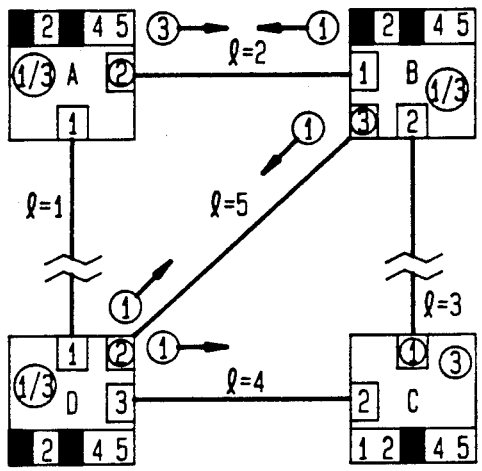

As indicated in FIG. 31, the next step is taken by node C which scans its link d=1 corresponding to l=3. Since the node C already knows this link is down, no action is taken. The state of the network after node C's step is shown in FIG. 32.

Figure 32:
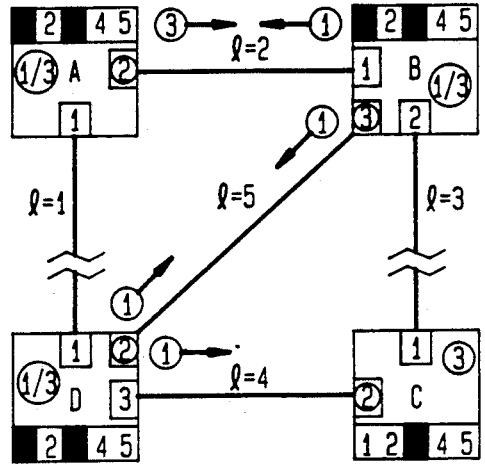

As indicated in FIG. 32, the next step is taken by node D which scans its link d=2 corresponding to l=5. The node D determines that the link l=5 is up and receives a message indicating that the link l=1 is down. Since this information is already known to the node D, the node D takes no action. The state of the network after node D's step is shown in FIG. 33.

Figure 33:
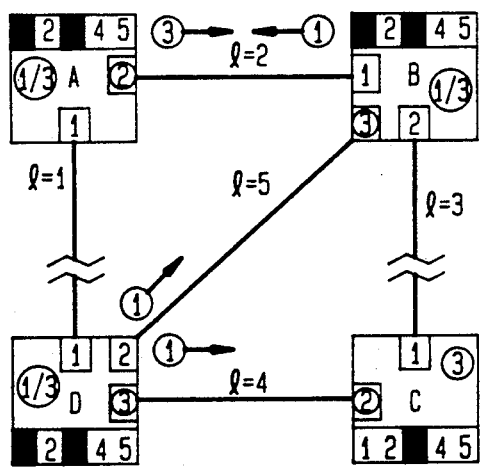

As indicated in FIG. 33, the next step is taken by node A which scans its link d=2 corresponding to l=2. The node A determines that the link l=2 is up and receives a message that the link l=1 is down. However, this is not new information for the node A, so no action is taken. The state of the network after node A's step is shown in FIG. 34.

Figure 34:
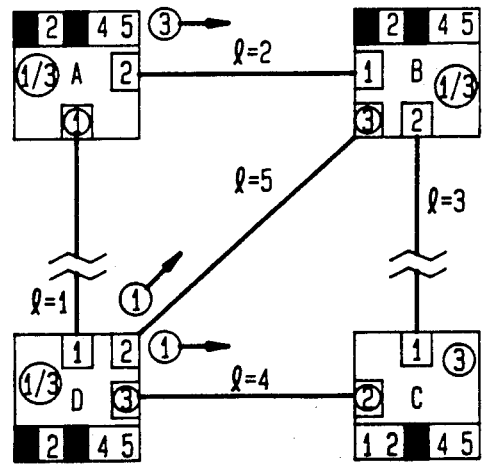

As indicated in FIG. 34, the next node to take a step is node B, which scans its link d=3 corresponding to l=5. The node B determines that the link l=5 is up and receives a message that the link l=1 is down. Since this is not new information for the node B, no action is taken. The state of the network after node B's step is shown in FIG. 35.

Figure 35:
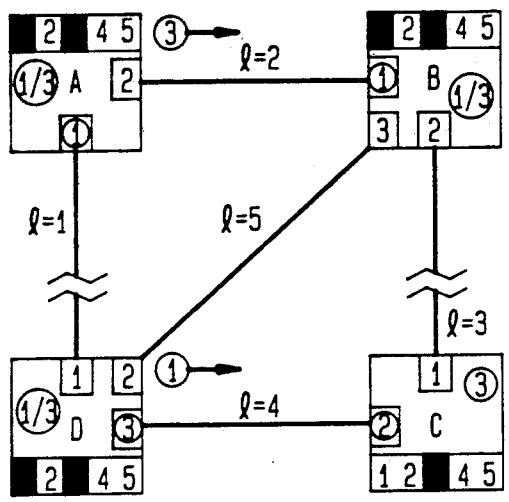

As indicated in FIG. 35, the next node to take a step is node C which scans its link d=2 corresponding to l=4. The node C determines that the link l=4 is up and receives a message indicating that the link l=1 is down. Since this is new information for the node C, as shown in FIG. 36, the node C updates its LINKS array, loads a new configuration table as determined by the updated LINKS array, and sends a message on its incident links indicating that l=1 is down, the message that is sent via l=3 being lost.

Figure 36:
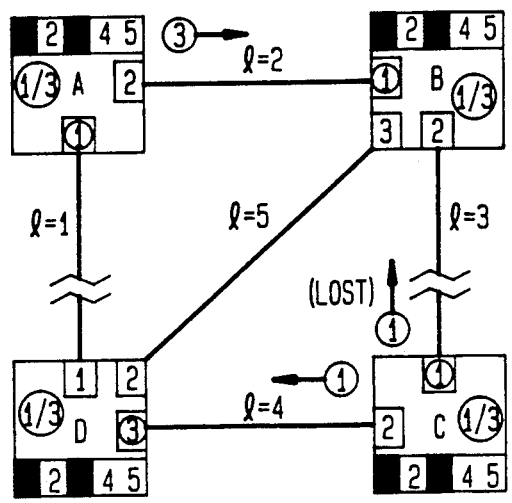

As indicated in FIG. 36, the next node to take a step is node D which scans its link d=3 corresponding to l=4. The node D determines that the link l=4 is up and receives a message that the link l=1 is down. Since the node D already knows this, no action is taken. The state of the network after node D's step is shown in FIG. 37.

Figure 37:
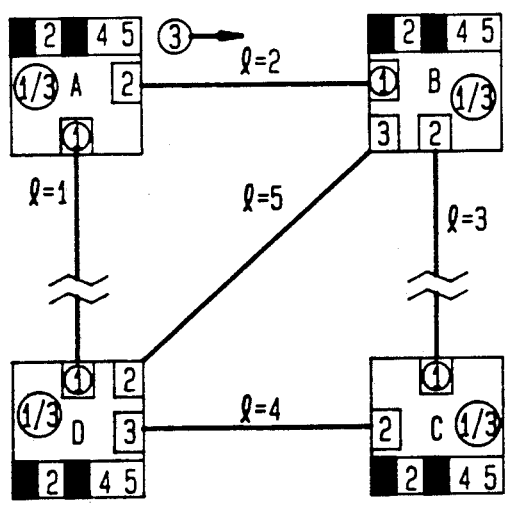

As indicated by FIG. 37, the next step is taken by node A which scans its link d=1 corresponding to l=1. Since this link is down and this is already known by the node A, the node A takes no further action. The state of the network after node A's step is shown in FIG. 38.

Figure 38:
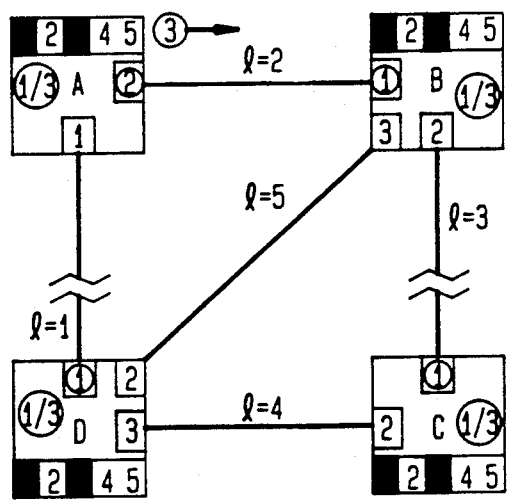

As indicated in FIG. 38, the next step is taken by node B which scans its link d=1 corresponding to l=2. The node B determines that the link l=2 is up and receives a message indicating that the link l=3 is down. Since this is already indicated in the LINKS array at node B, node B takes no action. The state of the network after node B's step is shown in FIG. 39.

Figure 39:
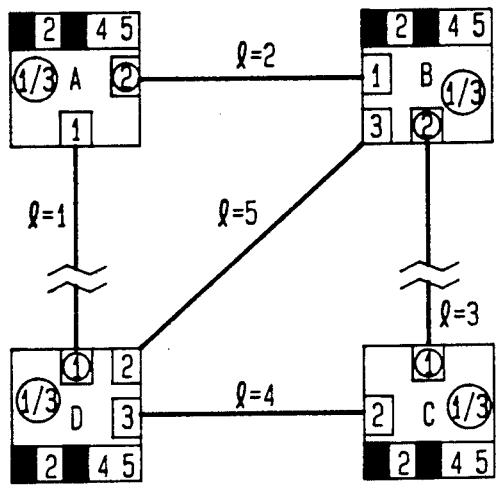

As indicated in FIG. 39, the next step is taken by node C which scans its link d=1 corresponding to l=3. Since the node C already knows this link is down no action is taken. The state of the network after node C's step is shown in FIG. 40.

Figure 40:
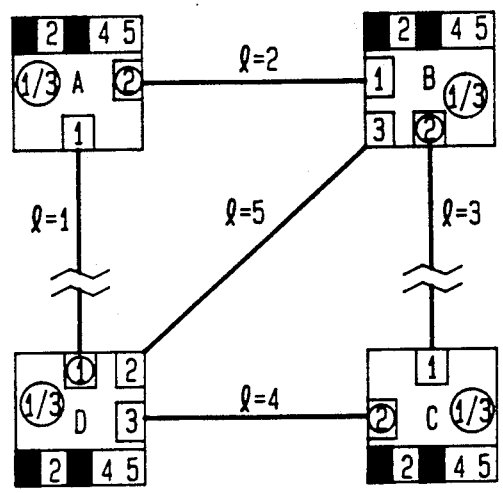

As indicated in FIG. 40, the next step is taken by node D which scans its link d=1 corresponding to l=1. Since the node D already knows this link is down, no action is taken. The state of the network after node D's step is shown in FIG. 41.

Figure 41:
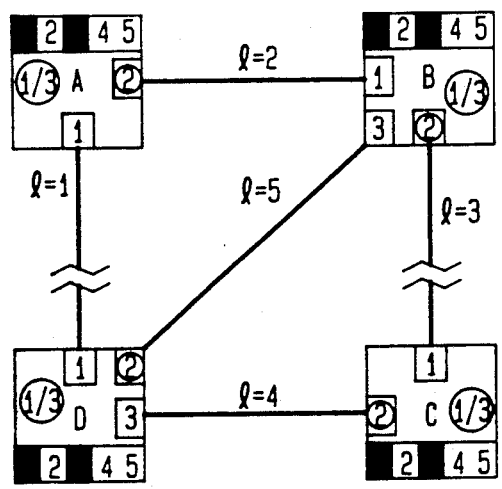

As indicated in FIG. 41 the next node to take a step is node A which scans its link d=2 corresponding to link l=2. The node A determines this link is up and takes no action. The state of the network after node A's step is shown in FIG. 42.

At this point in the example no more links fail, no more messages are set and no new configuration tables are loaded. However, in an actual network, the nodes would continue to execute the protocol, thereby continuing to scan incident links for failures or messages.

Figure 42:
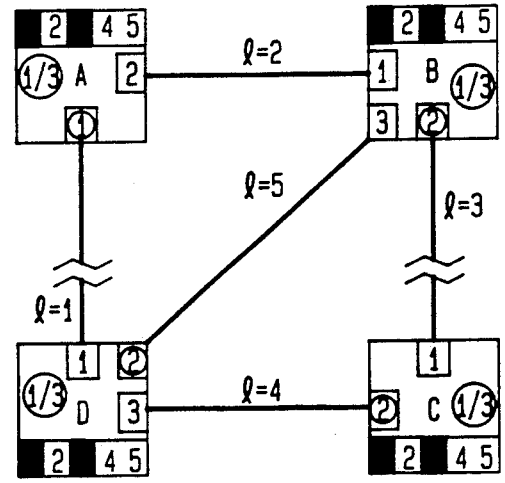

As can be seen in FIG. 42, as a result of the protocol, all of the nodes have converged to a consistent and correct picture of the existing network topology, i.e, that links l=1 and l=3 are down. In addition, each of the nodes has loaded a configuration table corresponding to this failure event. These configuration tables are shown in FIG. 9A. The rerouting of the logical connection as defined by these configuration tables for the failure of l=1 and l=3 is shown in FIG. 9B.

In short, a method for reconfiguring a telecommunications network comprising a plurality of reconfigurable cross-connect nodes interconnected by links has been disclosed. The method comprises the step of storing at each node a precomputed configuration table corresponding to each of a plurality of possible network topologies which result from a plurality of possible failure events. After a specific failure event occurs, the network is flooded with messages so that each of the nodes is informed a to the specific existing topology of the network which results from the specific failure event. The nodes are reconfigured in accordance with the specific precomputed configuration tables which correspond to the specific existing network topology.

To accomplish the foregoing, each node continually executes a protocol comprising the steps of:

(a) at each node, sequentially testing all of the links associated with the node which are indicated by a link status array to be working, (b) if a specific link is determined as a result of the testing step to be non-working, updating the link status array, sending a message on the links incident to the node that the specific link is non-working, and reconfiguring the node in accordance with a prestored configuration table corresponding to the particular pattern of non-working links indicated by the updated link status array, and (c) if a specific link is determined as a result of the testing step to be working and a message has been received via the specific link indicating that another link in the network is non-working and the link status array does not already indicate that the other link is non-working, sending a message on the other links incident to the node indicating that the other link is non-working, updating the link status array at the node, and reconfiguring the node in accordance with a prestored configuration table corresponding to the particular pattern of non-working links indicated by the updated link status array.

Finally, the above-described embodiments of the inventions are intended to be illustrative only. Numerous alternative embodiments may be devised by those skilled in the art without departing from the spirit and scope of the following claims.

We claim:

1. A method for reconfiguring a telecommunications network comprising a plurality of reconfigurable cross-connect nodes interconnected by links when a failure event occurs, said method comprising the steps of storing at each node a precomputed configuration table corresponding to each of a plurality of possible network topologies which result from a plurality of possible failure events, after a specific failure event occurs, flooding the network with messages by sending from node to node messages of the specific failure event generated by the node detecting the specific failure event so that each of the nodes is informed as to the specific existing topology of the network which results from the specific failure event and such that the network nodes converge to a consistent and correct picture of the existing network topology, and reconfiguring the nodes in accordance with the specific precomputed configuration tables which correspond to the specific existing network topology, wherein reconfiguration of the telecommunication network is accomplished without the use of a separate central network controller.

2. The method of claim 1 wherein said storing step comprises storing at each node a precomputed configuration table for each possible single link failure.

3. The method of claim 2 wherein, when there is a specific single link failure event, said reconfiguring step comprises reconfiguring the nodes in accordance with the precomputed configuration tables corresponding to the specific single link failure event.

4. The method of claim 2 wherein, when there is a failure event involving more than a single link, said reconfiguring step comprises installing at each node one of said single link failure configuration tables in accordance with a consistent rule followed at all of said nodes.

5. The method of claim 4 wherein all of said links in said network have identification numbers, and wherein said consistent rule followed at all of said nodes comprises installing at each node the single link failure configuration table for the failed link having the highest number.

6. The method of claim 1 wherein said storing step comprises storing at each node a precomputed configuration table for each possible single link failure and a precomputed configuration table for the most probable multiple link failures.

7. The method of claim 1 wherein said network is configured initially so there are particular logical connections established in said network, and wherein said configuration tables are computed to maintain said logical connections when corresponding failure events occur.

8. The method of claim 1 wherein said specific failure event comprises failure of one of said nodes.

9. A protocol carried out at each node in a network comprising a plurality of reconfigurable cross-connect nodes interconnected by links to reconfigure the network in the event of a failure event, said protocol comprising the steps of:

at each node, maintaining an array indicating the status of all of the links in the network, at each node, storing a plurality of predetermined configuration tables corresponding to a plurality of possible patterns of non-working links, at each node, sequentially testing all of the links associated with the node which are indicated by the array to be working, if a specific link is determined as a result of the testing step to be non-working, updating the array, sending a message on all links associated with the node indicating that the specific link is non-working, and reconfiguring the node in accordance with the predetermined configuration table corresponding to the pattern of non-working links indicated by the updated array if the node is not already in this configuration, if a specific link is determined as a result of the testing step to be working, determining if a message has been received via the specific link indicating that another link in the network is non-working and, if a message has been received via the specific link indicating that another link in the network is non-working and the array does not already indicate that the other link is non-working, updating the array, sending a message on all links associated with the node indicating that the other link is non-working, and reconfiguring the node in accordance with the predetermined configuration table corresponding to the pattern of non-working links indicated by the updated array if the node is not already in this configuration.

10. A protocol carried out continuously at each node in a network comprising a plurality of reconfigurable cross-connect nodes interconnected by links, said protocol comprising the steps of (a) at each node, sequentially testing all of the links associated with the node which are indicated by a link status array to be working, (b) if a specific link is determined as a result of said testing step to be non-working, updating the link status array, sending a message on the working links associated with the node that the specific link is non-working, and reconfiguring the node in accordance with a prestored configuration table corresponding to the particular pattern of non-working links indicated by the updated link status array, and (c) if a specific link is determined as a result of the testing step to be working and a message has been received via the specific link indicating that another link in the network is non-working and the link status array does not already indicate that the other link is non-working, sending a message on the working links associated with the node indicating that the other link is non-working, updating the link status array at the node, and reconfiguring the node in accordance with a prestored configuration table corresponding to the particular pattern of non-working links indicated by the updated link status array.

11. A method of reconfiguring a telecommunications network to maintain a set of logical connections defined in said network in the event of a failure of a component in said network, said method comprising storing at each node in said network a precomputed configuration table corresponding to each of a plurality of possible network component failures, after a specific failure of one or more network components, flooding the network with messages by sending from node to node messages of the failure events generated by the nodes detecting the specific failure events so that each of the nodes is informed of the specific failure and the network nodes converge to a consistent and correct picture of the existing network topology, and reconfiguring the nodes in accordance with the specific precomputed configuration tables corresponding to the specific failure to maintain said set of logical connections.

12. The method of claim 11 wherein said specific failure comprises the failure of a link of said network.

13. The method of claim 11 wherein said specific failure comprises the failure of a node of said network.

14. A method for reconfiguring a telecommunications network comprising a plurality of reconfigurable cross-connect nodes interconnected by links when a failure event occurs, said method comprising the step of storing at each node a precomputed configuration table corresponding to each of a plurality of possible network topologies which result from a plurality of possible failure events, after a specific failure event occurs, detecting the specific failure event at a node, generating messages of the failure event from the node detecting the failure event over the links associated with said detecting node to other nodes connected to said detecting node by associated links, sending from node to node the messages generated in said generating step such that the network nodes converge to a consistent and correct picture of the existing network topology, and reconfiguring the nodes in accordance with the specific precomputed configuration tables which correspond to the specific existing network topology.

* * * * *